(12) United States Patent
Stall et al.

(10) Patent No.: US 8,239,832 B2
(45) Date of Patent: Aug. 7, 2012

(54) IN-PROCESS DEBUGGING USING EXTERNAL DEBUGGING INFRASTRUCTURE

(75) Inventors: J. Michael Stall, Bothell, WA (US); Jan Stranik, Bellevue, WA (US); Richard Byers, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1350 days.

(21) Appl. No.: 11/807,246

(22) Filed: May 25, 2007

(65) Prior Publication Data

US 2008/0295078 A1    Nov. 27, 2008

(51) Int. Cl.
*G06F 9/44* (2006.01)
*G06F 9/45* (2006.01)

(52) U.S. Cl. .......................... 717/124; 717/128; 717/129
(58) Field of Classification Search ........... 717/124–132
See application file for complete search history.

(56) References Cited

U.S. PATENT DOCUMENTS

| | | | | |
|---|---|---|---|---|
| 5,446,900 A * | 8/1995 | Kimelman | .................... | 717/124 |
| 5,611,043 A * | 3/1997 | Even et al. | .................. | 714/38.13 |
| 5,675,803 A * | 10/1997 | Preisler et al. | ................. | 717/131 |
| 5,778,230 A | 7/1998 | Wimble et al. | | |
| 5,815,714 A * | 9/1998 | Shridhar et al. | ............. | 717/129 |
| 5,819,093 A * | 10/1998 | Davidson et al. | ............. | 717/126 |
| 5,838,975 A * | 11/1998 | Abramson et al. | ........... | 717/129 |
| 5,881,288 A * | 3/1999 | Sumi et al. | ..................... | 717/125 |
| 5,907,709 A * | 5/1999 | Cantey et al. | ................. | 717/141 |
| 5,933,639 A | 8/1999 | Meier et al. | | |
| 6,058,393 A * | 5/2000 | Meier et al. | ................... | 717/124 |
| 6,185,732 B1 | 2/2001 | Mann et al. | | |
| 6,202,199 B1 * | 3/2001 | Wygodny et al. | ............. | 717/125 |
| 6,282,701 B1 * | 8/2001 | Wygodny et al. | ............. | 717/125 |
| 6,353,923 B1 * | 3/2002 | Bogle et al. | .................... | 717/128 |
| 6,412,106 B1 * | 6/2002 | Leask et al. | .................... | 717/124 |
| 6,530,079 B1 * | 3/2003 | Choi et al. | ..................... | 717/158 |
| 6,826,746 B2 * | 11/2004 | Evans et al. | .................... | 717/124 |
| 6,915,509 B1 | 7/2005 | Chkodrov et al. | | |
| 6,938,245 B1 * | 8/2005 | Spertus et al. | ................. | 717/127 |
| 6,988,264 B2 * | 1/2006 | Sarma et al. | ................... | 717/128 |
| 7,010,781 B1 * | 3/2006 | Brown et al. | ................... | 717/124 |
| 7,028,291 B2 * | 4/2006 | Sumida et al. | ................. | 717/128 |

(Continued)

FOREIGN PATENT DOCUMENTS

| | | |
|---|---|---|
| JP | 2002366378 A | 12/2002 |
| KR | 100417655 B1 | 6/2004 |
| WO | 2005076139 A1 | 8/2005 |

OTHER PUBLICATIONS

Corliss et al, "Low overhead interactive debugging via dynamic instrumentation with DISE", IEEE HPCA, pp. 1-12, 2005.*

(Continued)

*Primary Examiner* — Anil Khatri (57) ABSTRACT

An in-process debugging experience can be implemented using an infrastructure that supports out-of-process debugging. A program that is to be debugged may be written in a command-line language that receives and processes input through an input loop. The interpreter for the language runs in a first process. A helper program is started in a second process, and attaches to the first process as if it were an out-of-process debugger. A debugging module is loaded into the interpreter, which provides user debugging commands that may utilize the helper program. When the program to be debugged generates a debug event, the event is received by the helper process, which uses a debug primitive to start a new instance of the input loop in the first process. Debugging commands provided by the debugging module can be entered by the user into the new instance of the input loop.

18 Claims, 7 Drawing Sheets

U.S. PATENT DOCUMENTS

| | | | |
|---|---|---|---|
| 7,089,534 B2* | 8/2006 | Hartman et al. | 717/125 |
| 7,150,006 B2 | 12/2006 | Bliss et al. | |
| 7,197,745 B2* | 3/2007 | Ray et al. | 717/127 |
| 7,203,926 B2* | 4/2007 | Bogle et al. | 717/124 |
| 7,266,809 B2* | 9/2007 | Tsubata et al. | 717/129 |
| 7,644,394 B2* | 1/2010 | Arnold et al. | 717/128 |
| 7,707,555 B2* | 4/2010 | Spertus et al. | 717/127 |
| 7,840,849 B2* | 11/2010 | O'Callahan | 714/45 |
| 8,156,476 B2* | 4/2012 | Maybee et al. | 717/124 |
| 2005/0022167 A1 | 1/2005 | Gryko et al. | |
| 2005/0034104 A1 | 2/2005 | Pugh et al. | |
| 2006/0041866 A1 | 2/2006 | Sivaram | |
| 2006/0064677 A1 | 3/2006 | Bickson et al. | |
| 2006/0288332 A1 | 12/2006 | Sagar et al. | |

OTHER PUBLICATIONS

Yin et al, "A fine grained debugger for aspect oriented programming", ACM AOSD, pp. 59-70, 2012.*

Borger et al, "A generic and reflective debugging architecture to support runtime visibility and traceability of aspect", ACM AOSD, pp. 173-184, 2009.*

Koju et al, "An efficient and generic reversible debugger using the virtual machine based approach", ACM VEE, pp. 79-88, 2005.*

Efstathopoulos et al, "Managable fine grained information flow", ACM EuroSys, pp. 301-313, 2008.*

International Search Report and Written Opinion of the International Searching Authority, dated Dec. 10, 2008, Application No. PCT/US2008/064005, 10 pages.

Jones Jeremy, "Interactive Debugging in Python", Date: Sep. 1, 2005, http://www.onlamp.com/pub/a/python/2005/09/01/debugger.html.

Pellegrino, Mike, "Improve Your Understanding of .NET Internals by Building a Debugger for Managed Code", MSDN Magazine, retrieved at <<http://msdn.microsoft.com/msdnmag/issues/02/11/CLRDebugging/ >>, publication date: Nov. 2002, pp. 1-13.

* cited by examiner

Program 400

Local variable(s) 402

[local variable(s) 404 for return value]

Statement 406

Statement 408

Statement 410

Statement 412

Statement 414

Return [value]

IN-PROCESS DEBUGGING USING EXTERNAL DEBUGGING INFRASTRUCTURE

BACKGROUND

When software is being developed, the software may not behave as the programmer expects. A debugger may be used to analyze the behavior of the program and/or to experiment with varying execution scenarios, which may provide clues as to the source of the unexpected behavior.

Debuggers can be "out-of-process" or "in-process." An out-of-process debugger is an application that acts on program that is being debugged (the debuggee) from outside of the process in which the debuggee executes. The debuggee exposes inspection and control models to the out-of-process debugger, which provides a rich interface from which the debugger can examine the debuggee's process and manipulate the debuggee's execution. Modern execution environments typically provide an infrastructure that facilitates implementation of an out-of-process debugger. An in-process debugger is built into the development software in which code is being developed. For example, a command-line language interpreter could have debugging commands hard-coded into the interpreter, so that the debug commands can be accessed from the interpreter's command-line interface.

In-process debuggers provide a simple user experience, in that the user can write and debug code in one process through one user interface, and the debugging support is integrated with the execution environment. Out-of-process debuggers, on the other hand, use the debugging infrastructure that several execution environments provide to support the out-of-process model. Debuggers that provide the in-process user experience have not made use of this infrastructure.

SUMMARY

An in-process-debugging user experience can be implemented using the debugging infrastructure that supports out-of-process debugging. A debugging module, which provides commands for various debugging tasks (e.g., examining symbols, setting breakpoints, etc.), can be loaded into a development program, such as a command-line interpreter for a language. The debugging module uses a helper program that runs in a process separate from the development program. The helper program attaches, as an out-of-process debugger, to the process in which the development program is running. From the perspective of the process in which the development program runs, the helper process is like an out-of-process debugger, and the helper process is thus able to make use of the debugging infrastructure that an out-of-process debugger would use to inspect and manipulate a debuggee. When a user issues a debug command through one of the functions provided by the debugging module, code in the module calls on the helper process to assist in carrying out the requested command. For example, if the user issues a command to set a breakpoint, the debugging module calls on the helper process to use a primitive from the debug infrastructure to set the breakpoint.

The development program may provide a read-eval-print loop (REPL loop), that receives and processes user input. An example of user input that may be entered is a command to invoke the program to be debugged. When a debug event arises in the program, the helper program is notified and invokes a second instance of the REPL loop in the development program. The loop is pushed on the execution stack on top of the debuggee program's frame, which preserves the state of the debuggee for inspection and manipulation. Additionally, the second instance of the REPL loop provides a mechanism through which the user can continue to enter input and interact with the development program. The second instance of the REPL loop can be invoked through a primitive of the debug infrastructure, such as a func-eval primitive, or other mechanism through which a debugger can invoke a function in the debuggee.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

In-process debugging typically provides a simple user experience: the user can enter debugging commands from the same command-line interface that is being used to enter and execute code. In-process debugging is normally implemented by hard-coding debug commands, or hooks to be used to by debug functions, into the software that implements the command-line processor. Modern execution environments often provide a debug infrastructure that can be used to implement out-of-process debuggers, and the implementation of in-process debugging normally does not make use of this existing infrastructure (although a system that provides in-process debugging may have its own debug infrastructure). However, it is possible to use the infrastructure that supports out-of-process debugging to implement an in-process debugging experience.

In out-of-process debugging, the debugger may be an application that resides in a separate process from the program that is being debugged (the debuggee). Thus, an out-of-process debugging application views the debuggee from an external perspective, and is able to inspect and manipulate the debuggee from outside the debuggee's process. The debug infrastructure provided by many execution environments may be designed on an assumption that the debugger application has this external perspective, which may complicate the use of such infrastructures to implement in-process debugging.

To implement an in-process debugging experience using the debug infrastructure, a helper program is created, which is run in a separate process from the debuggee. The helper program attaches to the debuggee's process as if it were an out-of-process debugger, and uses the debug infrastructure of the relevant environment to inspect and manipulate the debuggee. A debugging module that is loaded into the process where the debuggee runs provides debugging commands that can be called by the user. These commands use the helper process to perform some of the actions. For example, if the user instructs to inspect a symbol, set a breakpoint, etc., the debugging module may call upon the helper process to use the debug infrastructure's primitives for inspecting symbols, setting breakpoints, etc.

The command-line processor receives, and processes, user input through a REPL loop. When the command-line processor is started, the function that implements the REPL loop is invoked to create an instance of the REPL loop. When the program to be debugged is started (e.g., by entering its name as input to the REPL loop), that program is pushed on the stack, thereby displacing the REPL loop as the current frame. If the program being debugged raises an exception, the user may wish to enter debug commands into the command-line interface—e.g., into the input phase of the REPL loop. Returning to the existing instance of the REPL loop would pop the program that is being debugged off the stack, thereby losing that program's state. So the helper process, upon being notified of the exception, uses a debug primitive such as func-eval to start a second instance of the REPL loop. The user may then enter debug commands into the second instance of the REPL loop, while the state of the program being debugged may be preserved on the stack for inspection and manipulation.

Example Execution Environment in which Software Development May Occur

Figure 1:
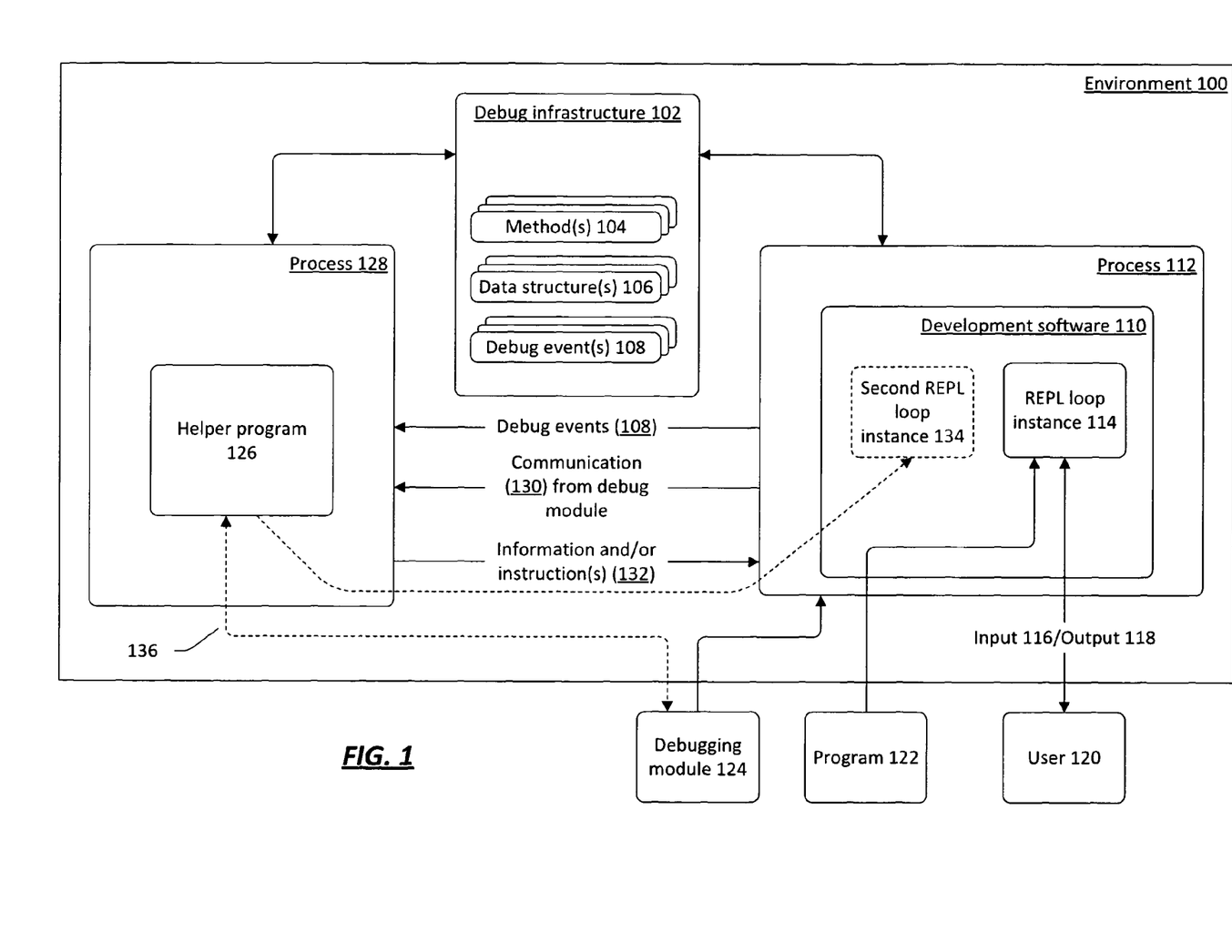
FIG. 1 is a block diagram of an execution environment in which software development may occur.

FIG. 1 is a block diagram of an example execution environment in which software development may occur. Environment 100 provides an infrastructure that may be used to develop and execute software. This infrastructure may provide various features such as an object-oriented programming model, a virtual machine and an associated virtual machine language, dynamic linking, garbage collection, etc. Examples of systems that provide an execution environment like environment 100 are the Microsoft .NET system, the JAVA system, various operating systems, etc.

An execution environment may provide a debug infrastructure 102. Debug infrastructure 102 is typically designed to facilitate debugging using an out-of-process model. That is, a program to be debugged (the debuggee) may be instrumented with certain debug symbols and other information. Debug infrastructure 102 may be able to interact with the debuggee through such instrumentation. Thus, a debugger application may use debug infrastructure 102 to examine and control the debuggee program. The debugger application and debuggee program may run in separate processes. Debug infrastructure 102 provides a rich inspection and flow-control model that enables the debugger application to examine and control the debuggee. For example, debug infrastructure 102 may include functionality to examine symbols in the debuggee, set breakpoints, start and/or stop the debuggee, execute arbitrarily-selected functions in the debuggee, examine the stack, notify the debugger of certain events and/or exceptions arising in the debuggee, etc. It should be noted that debug actions may loosely be characterized as those that provide information (e.g., inspection of symbols, examination of the stack, etc.), and those that control the flow of a program (e.g., continue execution, set next statement, etc.). Debug infrastructure 102 may provide method(s) 104, and may define data structure(s) 106 and debug event(s) 108, which may be used by a debugger application to examine and control the debuggee. These items may be referred to as debug primitives. (Different debug primitives may be used depending on the debug function that is being performed—e.g., one primitive may be used to execute an arbitrary function, while another primitive may be used to set a breakpoint.) A typical implementation of a debugger application makes use of such features of debug infrastructure 102.

Development software 110 is a program that may execute within a process 112 in execution environment 100. Process 112 is a construct that may be provided by an operating system or other component, and typically has its own stack, virtual address space, etc. Development software 110 allows a programmer to develop and execute code. Development software 110 may take the form of and/or include a command-line interpreter, such as Iron Python. Other examples of development software 112 include a JAVA interpreter, a Perl interpreter, the various UNIX/Linux shells (e.g., Bourne shell, C shell, Z shell, etc.) It should be understood, however, that the subject matter described herein is not limited to interpreters of command-line-like languages, or to interpreted languages.

Development software 110 typically includes a function that implements a read-eval-print loop, which is often referred to as a REPL loop. The read-eval-print loop, as its name suggests, reads user input, evaluates the input, and prints (or otherwise displays) a result based on the input. When development software 110 starts, it typically invokes an instance 114 of REPL loop in order to receive input 116 from user 120, and to provide output 118 to user 120. For example, input 116 may comprise lines of code such as a function definition, a function call, an instruction to load a module, etc. Output 118 may comprise the output that results from executing a function, an error messages, etc.

Program 122 comprises program code that may execute within development software 110 and that may undergo debugging. Program 122 may take the form of an entire program, or a portion of a program such as a function definition, module definition, etc. Program 122 may be provided as input 116 to instance 114 of the REPL loop. For example, if development software 110 is an Iron Python interpreter, user 120 may enter the following code as input 116 to instance 114 of the REPL loop:

```
*> def divBySequence(N, x):
... if x < 0 : return N
... result = N / x
... return divBySequence(result, x−1)
...
*>
```

As discussed below, this definition of the function divBySequence may generate an exception due to a case in which it divides by zero, but it is nevertheless an example of a program 122. In addition to the example above in which program 122 is typed into instance 114 of the REPL loop, program 122 could be provided to development software 110 in other ways, such as loading a module from a stored file, downloading program 122 from a network, etc.

Debugging within development software 110 may be facilitated by two pieces of software—debugging module 124 and helper program 126—which may interact with each other to create a debugging experience in development software 110. (Line 136 represents interaction between debugging module 124 and helper program 126, and this interaction may take various forms, as described below.)

Debugging module 124 provides debug functionality that may be loaded into development software 110. For example, in the example where development software 110 is an Iron Python interpreter, a user may issue a command such as "import debugger" (e.g., by typing such a command into a prompt provided by instance 114 of the REPL loop), which causes debugging module 124 to be loaded into the process 112 in which development software 110 runs. Debugging module 124 may expose functions that the user can invoke to perform various debugging actions (e.g., inspection of symbols, inspection of the stack, continue program execution, etc.). By loading debugging module 124 into process 112, a user of development software 110 is able to call these functions. For example, to inspect the stack, a user might call a function or method with a command like "debugger.where( )". Other commands, such as "debugger.CatchExceptions( )" (instruct debugger to stop when an exception arises), "debugger.show( )" (list the current function), "debugger.continue( )" (continue execution of the program after the program stops), etc., may be provided by debugging module 124.

Helper program 126 executes in process 128. Helper program 126 provides a kind of back-end functionality that can be used by debugging module 124. Inasmuch as debug infrastructure 102 is amenable to a model in which a debugging application is located in a separate process from a debuggee program, helper program 126 provides this out-of-process perspective. Thus, helper program is able to inspect aspects of process 112 (e.g., the stack, symbols, etc.), and can control the flow of process 112 (e.g., by setting breakpoints, jumping to arbitrary statements, executing arbitrary functions, etc.), as a typical out of process debugger would do. While a typical out-of-process debugger may be a console application that interacts directly with a user, helper program 126 may interact with debugging module 124, which, in turn, interacts with the user. This arrangement allows a user to debug from the user interface that development software 110 provides, rather than from a separate debugger application. (However, the subject matter described herein is not limited to the case where helper program 126 avoids interaction with the user. Helper program 126 may engage in interaction with the user.)

Helper program 126, debugging module 124, and processes 112 and 128, may interact with each other. For example, debug infrastructure 102, as noted above, defines certain debug events 108 (e.g., stack operations, the beginning or end of a function, exceptions, etc.) that can be communicated to a debugger about a process to which the debugger is attached. When helper program 126 is attached to process 112, then helper program 126 receives notification of such debug events 108. Additionally, debugging module 124 may send various communications 130 to helper program 126, and helper program 126 may provide information and/or instructions 132 to debugging module 124 and/or to process 112. (The communication represented by items 108, 130 and 132 are examples of the interaction, represented by line 136, between debugging module 124 and helper program 126. This interaction may occur by various mechanisms, such as through debug infrastructure 102.) For example, if user 120 requests, through debugging module 124, that a symbol named "x" be inspected, debugging module 124 may send a communication 130 to helper program 126 requesting that helper program 126 inspect the symbol named "x" on the stack of process 112. Helper program 126 may then use methods 104 provided by debug infrastructure 102 to inspect the value of "x" on process 112's stack, and may then write the value of symbol x into a data location within process 112 where debugging module 124 can retrieve the value and provide it to user 120. As another example, user 120 may use functions in debugging module 124 to request that a breakpoint be set, in which debugging module 124 can communicate the requested breakpoint to helper program 126, and helper program 126 can use methods 104 to set the breakpoint. Various types of interactions between debugging module 124, helper program 126, and processes 128 and 112 are described in detail below.

One action that may be taken by helper program 126 is to start a second instance 134 of the REPL loop in process 112. For example, if a program is executing, then that program may raise an exception that stops the program. For example, the divBySequence function described above, may raise an exception if a call to that function results in division by zero. The exception is an example of a debug event that an attached debugger, such as helper program 126, may be apprised of. When helper program 126 is notified of the exception, helper program 126 may use one of methods 104 (e.g., the "funceval" primitive of the .NET environment) to invoke a second instance 134 of the REPL loop in process 112. As described in greater detail below, the first instance 114 of the REPL loop is relatively high on the stack; further down the stack is a program 122 (such as the divBySequence function), which has been stopped by a user exception. (With respect to the stack in the foregoing example, the phrases "high" and "further down" refer to the example where the stack grows downward, although the subject matter described herein is not limited to any particular direction of stack growth.) Thus, the first instance 114 of the REPL loop may not be available for user input (e.g., it may not be available for the user to enter debugging commands provided by debugging module 124). By starting a second instance 134 of the REPL loop, the user can interact with development software 110 in order to enter debug commands, edit program code, etc. Additionally, when the second instance 134 of the REPL loop is created, the state of the program 122 that is being debugged is preserved, and therefore can be inspected and manipulated by helper program 126. As debugging progresses, the user may continue execution of program 122 from instance 134 of the REPL loop, which may cause further exceptions to arise. When such exceptions arise, helper program 126 may create additional instances of the REPL loop to allow the user to continue interacting with development software 110. Thus, when a debugging session has been going on for some time, there may be several instances of the REPL loop on the stack of process 112.

Thus, debugging module 124 provides a user debugging experience from inside the development software 110's user interface, and helper program 126 provides an out-of-process perspective that makes use of the inspection and control features of debug infrastructure 102. Communication between debugging module 124 and helper program 126 allows debugging module 124 to leverage the features of debug infrastructure that work with an out-of-process debugger program, and also allows helper program 126 to leverage debugging module 124's ability to interact with the user from within development software 110's user interface.

Use of Debugging Module Through Second REPL Loop

Figure 2:
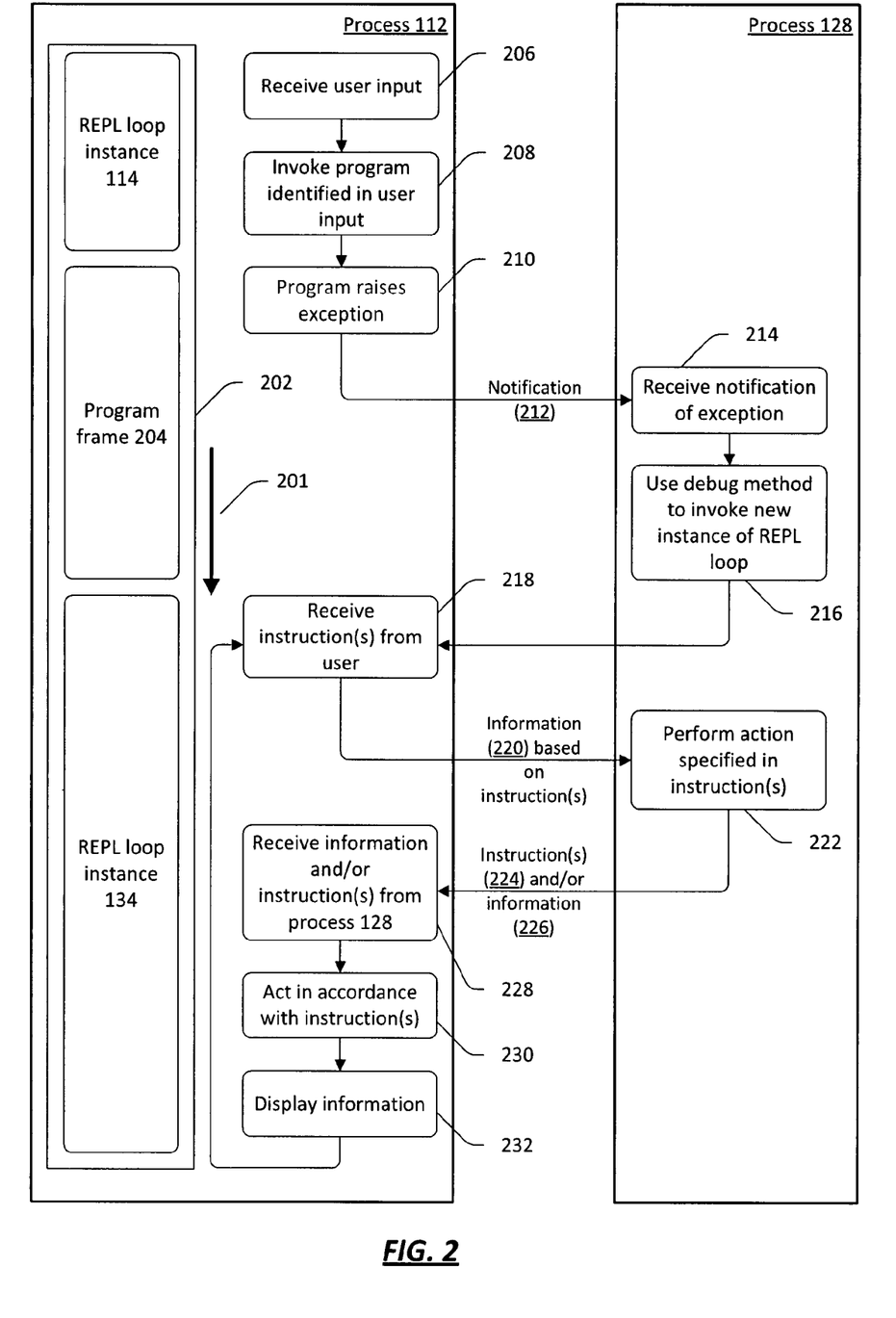
FIG. 2 is a flow diagram of a process of using an in-process debugger with a shadow external helper process.

FIG. 2 shows an example process of debugging, and also shows how a second instance of a REPL loop may be used in debugging. The process of FIG. 2, and the other example processes shown herein, are described with reference to components shown in FIG. 1, but may also be used in other systems. Moreover, while FIG. 2, and the other flow diagrams herein, use arrows to show a flow proceeding from one block to another, the flow that is depicted is merely an example, and the actions that are shown may be performed in any order and in any combination or sub-combination. Additionally, certain actions are shown as being performed by a particular process (as indicated by the inclusion of such actions within the boxes representing process 112 or 128), but the subject matter herein is not limited to the case where an action is performed by any particular process.

Stack 202 is process 112's stack, and is represented, by way of example, as growing downward. (Arrow 201 shows the direction of stack growth in this example.) Instance 114 of the REPL loop 114 is instantiated sometime after development software 110 (shown in FIG. 1) is started. Additionally, debugging module 124 (shown in FIG. 1) may be loaded into process 112, which makes its debugging functionality available to the user. At some point in time, instance 114 of the REPL loop receives user input (at 206). This user input may identify a program to be invoked (e.g., by typing the name of a function to be executed), in which case the program identified in the user's input is invoked (at 208). A frame 204 for the program is created on the stack. After the program is invoked, the program may raise an exception (at 210). For example, the divBySequence function described above, which is an example of a program, may result in division by zero, which raises an exception.

Helper program 126 (shown in FIG. 1) executes in process 128. Where helper program 126 is attached as a debugger to process 112, helper program 126 receives (at 214) a notification 212 of the exception that was raised in process 112. Helper program 126 uses a debug method to invoke a new instance 134 of the REPL loop (at 216). The debug method may be one of method(s) 104 (shown in FIG. 1). One example of a method that may be used is the "func-eval" debug primitive provided in the .NET environment, which allows a debugger to invoke an arbitrary function in the debuggee. It should be understood that systems other than .NET may provide functionality to invoke an arbitrary function from a debugger, and references to func-eval should not be understood as being limited to the .NET environment's func-eval primitive, or to methods having that name, but also encompasses methods of other systems that enable a debugger to invoke a function in a debuggee process. When the new instance 134 of the REPL loop is invoked, a frame for that new instance 134 is placed on the stack.

When the new instance 134 of the REPL loop is started, it is able to receive input or other instruction(s) from a user (at 218), e.g., through a command-line interface. One type of instruction that may be received is a debug command provided by debugging module 124. For example, the user may call a function provided by debugging module 124 in order to examine the stack, inspect the value of a symbol, etc. When such an instruction is provided, information 220 based on the instruction is communicated to process 128, which informs helper program 126 what type of debug action the user wants to perform. Helper program 126 performs the actions specified in the instructions (at 222)—e.g., by using debug infrastructure 102 (shown in FIG. 1) to inspect symbols, examine the stack, set breakpoints, etc. Some examples of such actions are discussed below in connection with FIG. 3.

The actions performed at 222 may result in either instruction(s) 224 and/or information 226 being provided form process 128 to process 112. For example, if the action performed at 222 is the inspection of the value of a symbol, then helper program 126 may provide information 224 which includes the value of the symbol. Helper program 126 may, for example, use debug infrastructure 102 to write this information into a location in process 112's address space, where it may be retrieved by debugging module 124. As another example, if the action performed at 222 is the resumption of the debuggee program (e.g., program 122, shown in FIG. 1), then helper program 126 may use debug infrastructure 102 to issue instruction(s) 226 to process 112 to unwind the stack to the program's frame 204, clear pending exceptions, and then continue executing the program at the point where the exception was raised. The information 224 and/or instruction(s) 226 are received by process 112 from process 128 (at 228). Process 112 then acts in accordance with the instructions (at 230) and/or may display the received information (at 232). The display of information at 232 may be performed, for example, in the case where the user has requested to inspect a symbol, in which case the current value of that symbol may be displayed. As another example, if process 112 has been instructed to act in some manner (e.g., at 230), such as in a manner that controls the flow in program 122, then the result of executing program 122 may be displayed after such flow-control has been exerted. The flow then cycles to the input phase of instance 134 of the REPL loop to receive more input from the user.

Figure 3:
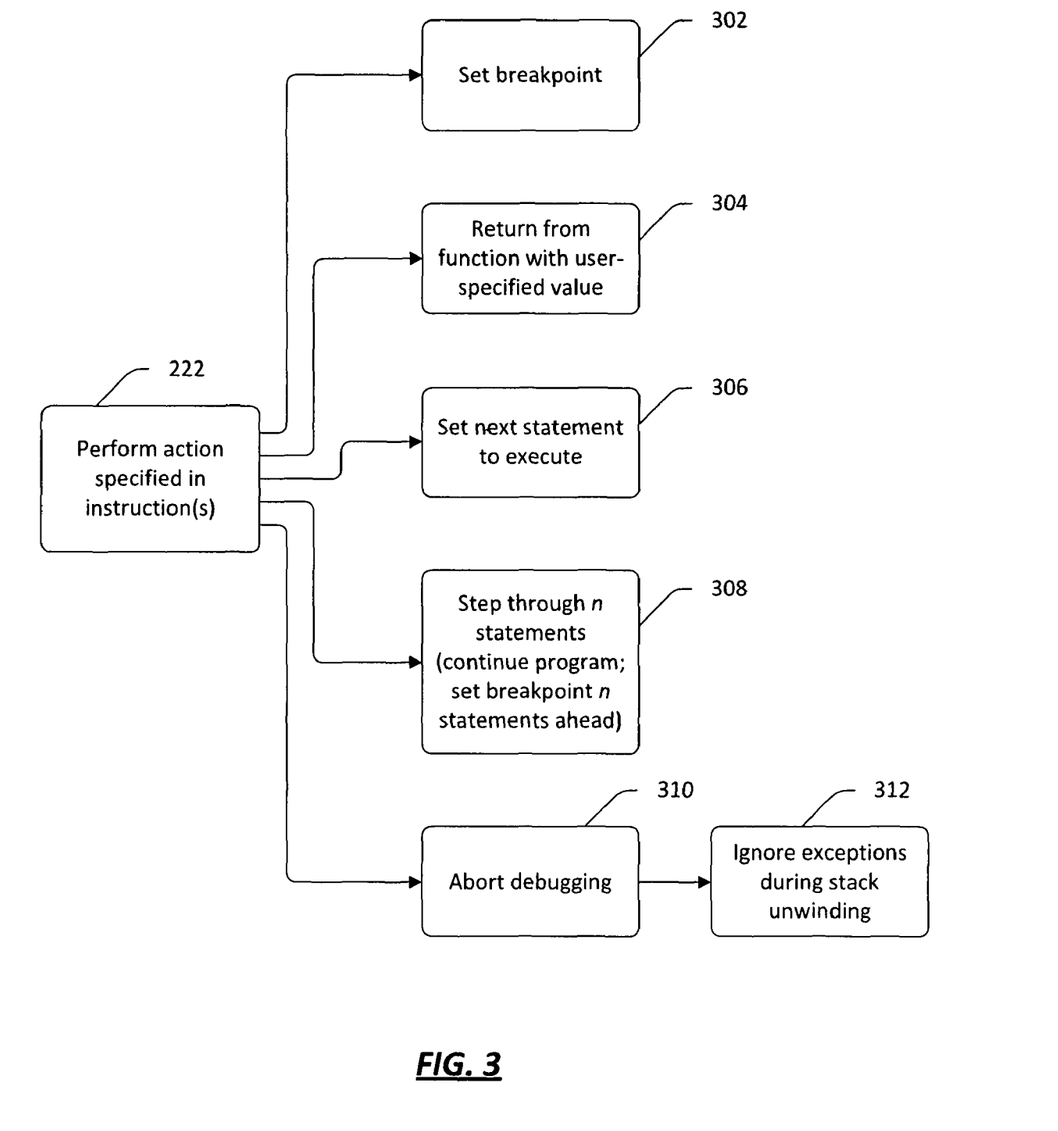
FIG. 3 is a flow diagram of various actions that may be performed with a debugger.

FIG. 3 shows various actions that may be performed with a debugger. FIG. 3 shows block 222 (from FIG. 2), at which specified actions are performed. FIG. 3 shows various examples of actions that can be performed at 222. The actions shown in FIG. 3 may, for example, be performed by helper program 126 (shown in FIG. 1), and may involve cooperation from the debuggee process 112 and/or debugging module 124 (both shown in FIG. 1).

Figure 4:
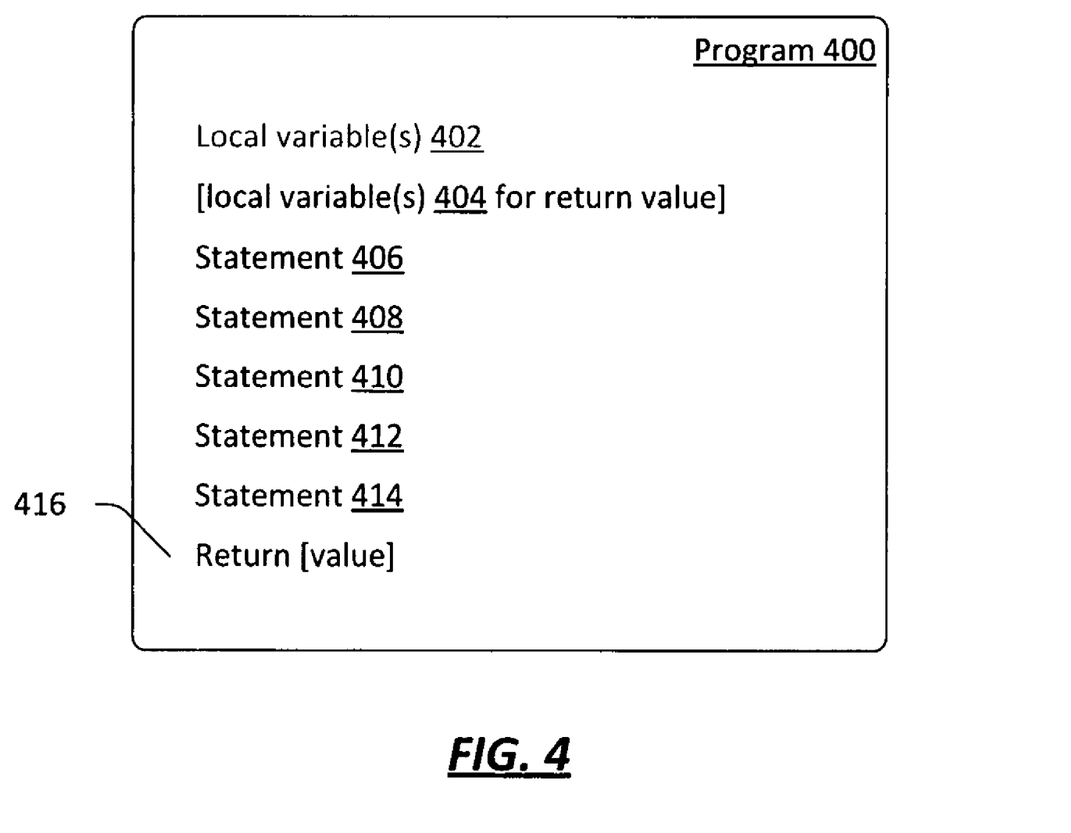
FIG. 4 is a block diagram of an example program.

The actions of FIG. 3 are described below with reference to the example program 400 in FIG. 4. Program 400 comprises a declaration of local variable(s) 402, as well as one or more local variable(s) 404 that can be used as return value as part of a mechanism that is described below. Additionally, program 400 comprises statements 406, 408, 410, 412, and 414, and a return statement 416. Program 400 is only one example of a program, and other programs could contain a different number of statements, more (or fewer) variable declarations, branches, conditionals, additional return statements, etc.

Returning to FIG. 3, one example of an action that may be performed is to set a breakpoint (at 302). For example, the user may specify a breakpoint through a function of debugging module 124 (shown in FIG. 1), and this specification may be communicated to helper program 126 (shown in FIG. 1). Debug infrastructure 102 (shown in FIG. 1) may include a primitive to set a breakpoint in the debuggee. If a breakpoint is set at statement 410 in program 400, then program 400 stops executing, and a debug event is generated, when statement 410 is reached.

Another example action is to return from a function with a user-specified return value (at 304). For example, if a function raises an exception, the user may choose not to let the function continue executing, but rather may choose to specify a return value for the function and then have the rest of the program continue as if the function had completed execution and had returned the specified value. This action may be performed by writing the specified value into a place where the return value would normally be found (e.g., in a specified location on the stack, in a designated register, etc.), and instructing the program proceed from the point where the function exits. One way of implementing the ability to set a return value is to instrument the debuggee program to include one or more local variable(s) 404 (which may be usable by a debugger, but may be hidden from the debuggee program itself). The return value to be set by the user can be written into local variable(s) 404, and then the instruction pointer can be updated to point to a return instruction 416 such that the value in the local variable(s) 404 are returned by the function when the program resumes executing.

Another example action is to set the next statement to execute (at 306). For example, program 400 may be executing statement 408 when it stops for a debug event. The next statement that would execute in sequence is statement 410, but a user may specify that the next statement that should be executed is statement 414. A primitive provided by debug infrastructure 102 (shown in FIG. 1) may be used to set the program counter to point to the instruction that corresponds to the beginning of statement 414.

Another example action is to step through the next n statements—that is, to execute n statements and then stop (at 308). An overall technique described herein builds in-process debugging on top of out-of-process debugging, and can directly leverage out-of-process techniques. Thus, an instruction received from a user to step through n statements can be implemented by the development software request (e.g., through debugging module 124, shown in FIG. 1) that helper program 126 (shown in FIG. 1) use a step primitive to step through n statements, as would an out-of-process debugger.

Another example action is to abort debugging (at 310)—e.g., to return to the top-level REPL loop and to stop having exceptions invoke the debugger. During the course of debugging, several instances of REPL loops may have been created, each of which may have been created by an exception. The corresponding debug module command could invoke an exception, which would naturally cause the stack to unwind. Thus, as the stack is being unwound to remove the various nested instances of REPL loops, the attached debugger (e.g., helper process 126, shown in FIG. 1) may be instructed not to notify the user of exceptions during the unwinding process (at 312)—e.g., until the frame on the stack that corresponds to the first instance of the REPL loop (numeral 114, shown in FIG. 1) is reached.

Continuing Execution of a Program

Figure 5:
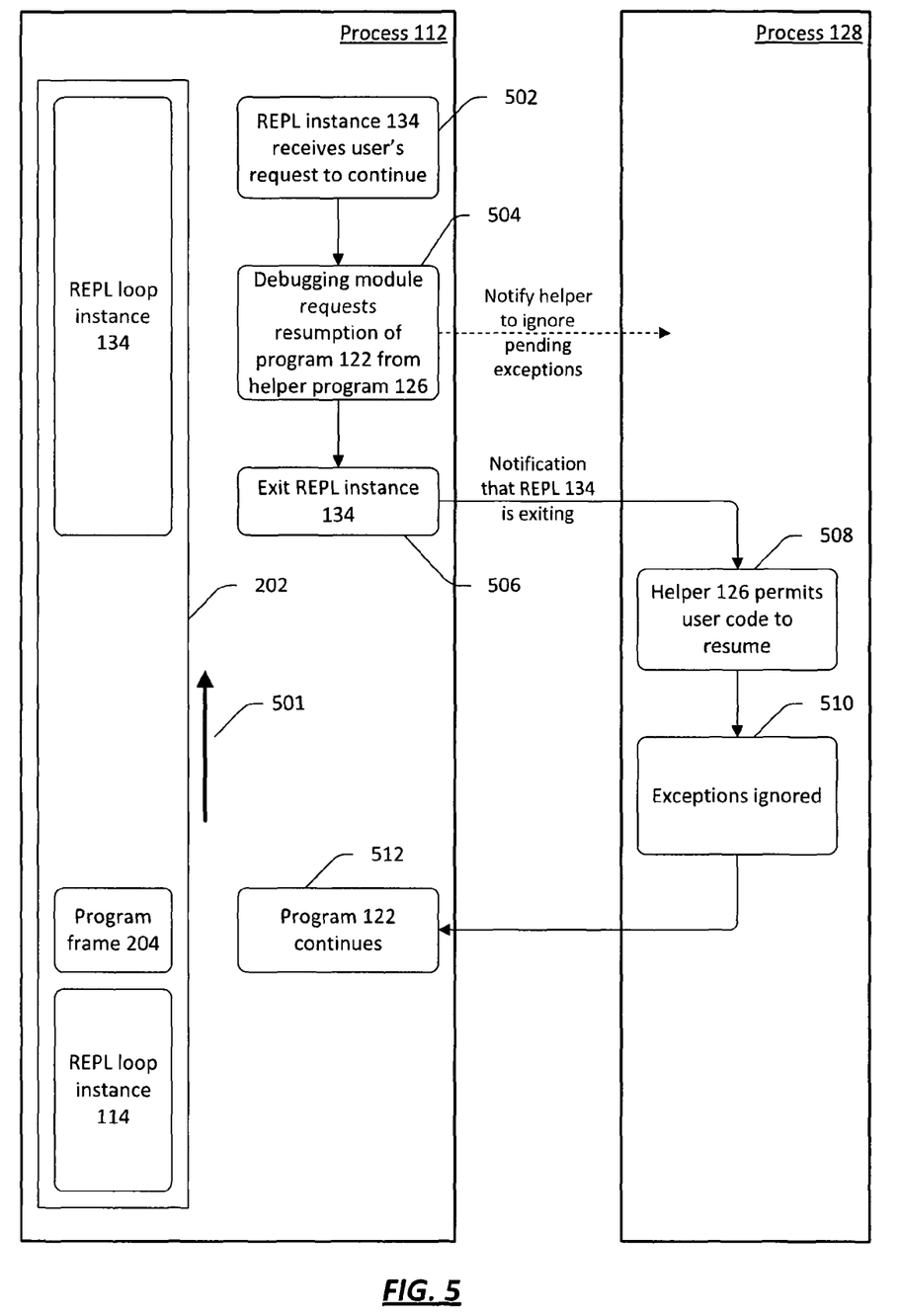
FIG. 5 is a flow diagram of a process of continuing execution of a program from a debugger.

Continuing execution of a program is an example of a debugging action, and FIG. 5 shows an example process of continuing execution. In this example, stack 202 is shown alongside the various actions, and shows which frame is current for each of the various actions. (Arrow 501 represents the direction in which the stack grows.)

Instance 134 of the REPL loop presents the user with a prompt to enter an instruction or other input. Instance 134 of the REPL loop then receives from the user, at 502, a request to continue executing the debuggee program (e.g., program 122, shown in FIG. 1). For example, the user may issue a function exposed by debugging module 124 (shown in FIG. 1), such as "debugger.continue( )". Based on this request, the debugging module 124 (at 504) requests resumption of the program 122 from helper program 126 (shown in FIG. 1). As part of the request to helper program 126, debugging module 124 notifies the helper to ignore pending exceptions. For example, the exception that caused helper program 126 to create instance 134 of the REPL loop may remain pending at the time the user requests to continue, and helper program 126 is notified that it may clear such exception, which may prevent that exception from further influencing the execution flow of program 122 (shown in FIG. 1). At 506, instance 134 of the REPL loop is exited, and process 128, in which helper program executes, is notified of this exit.

At 508, helper program 126 permits the program (e.g., program 122) to resume executing. At 510, exceptions that are pending in program 122 are ignored. Program 122 then continues to execute in process 112 (at 512). With instance 134 of the REPL loop having been exited, its frame is removed from stack 202 so that the current frame, when program 122 resumes executing, is frame 204 for program 122. (For reference, the position of REPL loop instance 114, which is explained in connection with earlier figures, is also shown on stack 202.)

Symbol Resolution

Figure 6:
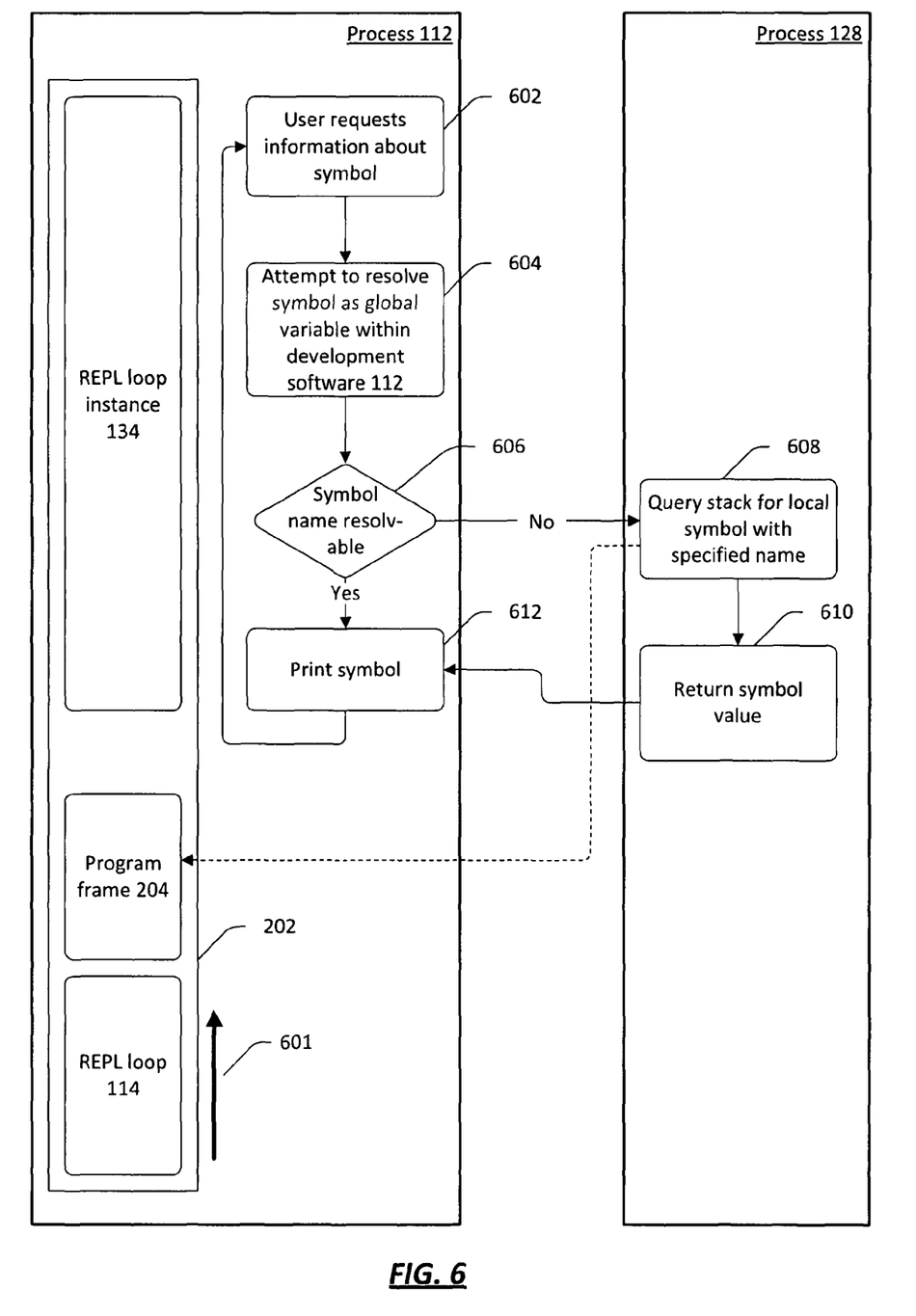
FIG. 6 is flow diagram of a process of resolving a symbol name.

FIG. 6 shows an example process of resolving a symbol name. For example, a user may use a function in debugging module 124 (shown in FIG. 1) to request the value of a symbol having a particular name. As another example, instead of using an explicit function in debugging module 124, the logic that is accessed through the REPL loop's ordinary symbol-resolution syntax (e.g., the logic that displays the value of a symbol when the symbol name is typed into the REPL loop's prompt) may be augmented or modified through hooks to allow resolution of symbols according to the logic shown in FIG. 6. Debugging module 124 and/or REPL loop instance 134, and helper program 126 (shown in FIG. 1), may use the process shown in FIG. 6 to resolve the symbol name. In the example of FIG. 6, stack 202 is shown alongside the various actions to show which frame is current for each of the various actions. The position of frames from FIGS. 2 and 5—REPL loop instances 114 and 134 and program frame 204—are shown on stack 202. (Arrow 601 represents the direction in which the stack grows.)

At 602, a user requests information about a symbol. This request may, for example, be made by using instance 134 of the REPL loop to invoke a function provided by debugging module 124. (E.g., examination of the symbol named "x" could be requested with a function call such as debugger.examine("x")). As another example, the user could request the value of the symbol using the REPL loop's ordinary syntax for doing so—e.g., by typing 'x' to the REPL loop's prompt. As discussed below, aspects of the process of FIG. 6 can be implemented as functions provided by debugging module 124, or by augmenting the symbol resolution mechanism of REPL loop instance 134 to allow it to perform these functions. Regardless of whether the request is made with an explicit function in debugging module 124, or through the symbol-resolution syntax of the REPL loop itself, the process then proceeds to 604. At 604, an attempt is made to resolve the name of the requested symbol by checking whether it is the name of a global symbol. (Global symbols are accessible from within the scope of REPL loop instance 134.) If the symbol is resolvable as a global symbol (as determined at 606), then the value of the symbol is displayed (at 612), and the flow cycles to the input phase of instance 134 of the REPL loop to await more user input. If the symbol name is not resolvable (as determined at 606), then a request is made that helper program 126 in process 128 look up the symbol. Helper program 126 is an attached debugger and is able to use debug infrastructure 102 (shown in FIG. 1) to reach into various portions of stack 202, such as the frame 204 (which is a frame for the debuggee program). Thus, helper program 126 queries the stack for a local symbol with the specified name (at 608), and returns (at 610) the value of the symbol to process 112. The value is then displayed (at 612).

As noted above, a request to look up a symbol can be made explicitly through a function provided in debugging module 124 (e.g., "debugger.examine("x")"), or through the ordinary syntax through which symbol values are requested (e.g., by typing 'x' to the prompt provided by the REPL loop). In the former case, the function debugger.examine, implements the relevant logic—e.g., it performs blocks 604 through 606 of FIG. 6. In another example, this logic is implemented by augmenting the REPL loop's symbol resolution mechanism, which can be accomplished by having debugging module 124 hook into the variable resolution mechanism of REPL loop instance 134 to invoke elements of the process of FIG. 6, where such hooks in are available in the language interpreter of which the REPL loop is a part. Another way to enable symbol resolution is to proactively inject values into REPL loop instance 134 (or into other nested REPL loop scopes) when the nested REPL loop is created; thus, values such as the value of symbol "x" could be placed in the scope of REPL loop instance 134 by helper process 126 (shown in FIG. 1), so that these values can be found by the ordinary symbol resolution-mechanism of the REPL loop.

Example Implementation

Figure 7:
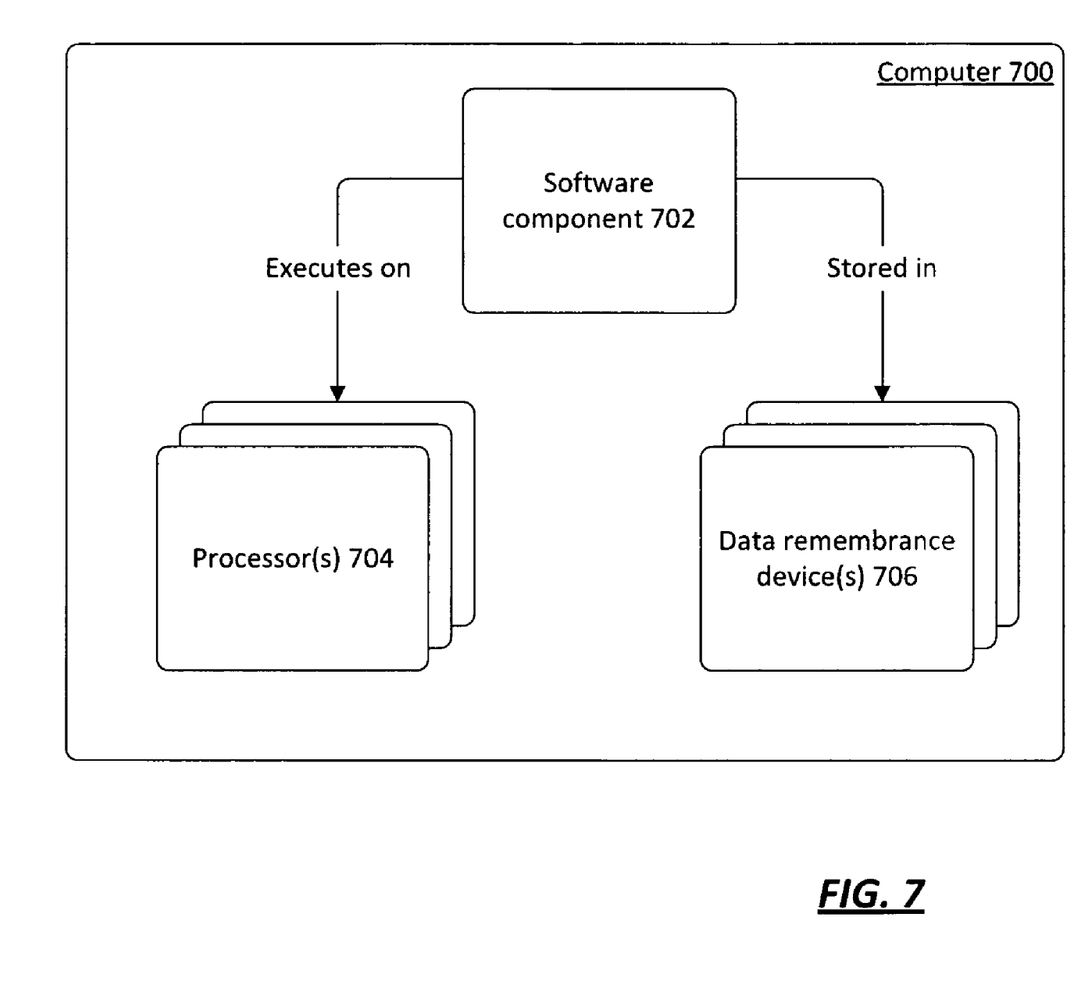
FIG. 7 is a block diagram of components that may be used to implement the subject matter described herein.

FIG. 7 shows an example environment in which aspects of the subject matter described herein may be deployed.

Computer 700 includes one or more processors 704 and one or more data remembrance devices 706. Processor(s) 704 are typically microprocessors, such as those found in a personal desktop or laptop computer, a server, or a handheld computer. Data remembrance device(s) 706 are devices that are capable of storing data for either the short or long term. Examples of data remembrance device(s) 706 include hard disks, removable disks (including optical and magnetic disks), volatile and non-volatile random-access memory (RAM), all types of read-only memory (ROM), flash memory, magnetic tape, etc. Data remembrance device(s) are examples of computer-readable media. Computer-readable media include both storage media such as data remembrance device(s) 706, as well as media that carry data ephemerally, such as electronic, magnetic, or optical signals.

Software (such as software component 702) may be stored in the data remembrance device(s) 706, and may execute on the one or more processor(s) 704. A personal computer in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance device(s) 706 and that executes on one or more of the processor(s) 704. As another example, the subject matter can be implemented as software having instructions to perform one or more acts, where the instructions are stored or carried on one or more computer-readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. One or more computer-readable storage media having executable instructions to perform a method comprising:
    receiving, in a first process, a notification that a debug event has arisen in a second process in which a debuggee program is being run in a first instance of a loop;
    using, by said first process, a first debug primitive to invoke, in said second process, a second instance of said loop;
    receiving, in said first process from said second process, a request to communicate information about a symbol defined in said second process, or to perform at least one flow-control action in said debuggee program, said request to communicate information about said symbol or to perform said at least one flow-control action having arisen in said first process by a user entering a debug command into said first instance of said loop;
    using said first debug primitive, or a second debug primitive, to perform an action specified in said request, said request being to set a return value of a function in said debuggee program to a value that is specified by a user;
    using said second debug primitive to place the value that is specified by said user in a memory location reserved for said function's return value;
    providing, from said first process to said second process, a value associated with said symbol, or directing, from said first process, that said second process perform said at least one flow-control action; and
    displaying said value associated with said symbol, or a result of said debuggee program resulting from said at least one flow-control action.

2. The one or more computer-readable storage media of claim 1, wherein said request is to carry out a number of statements in said debuggee program, and wherein the method further comprises:
    using said second debug primitive to direct said debuggee program to carry out said number of statements.

3. The one or more computer-readable storage media of claim 1, wherein said request is to abort debugging, and wherein said method further comprises:
    avoiding notifying a user of exceptions generated by said second process when an execution stack in said second process is unwound, until said first instance of said loop is reached in said execution stack.

4. The one or more computer-readable storage media of claim 1, wherein said request is to continue execution of said debuggee program, and wherein the method further comprises:
    receiving a second notification that said second instance of said loop has terminated; and
    permitting said second process to resume execution of said debuggee program from a point where said program was executing when said debug event arose.

5. The one or more computer-readable storage media of claim 1, wherein said request is to continue execution of said debuggee program, and wherein the method further comprises:
    receiving, from said second process, an indication that outstanding exceptions are to be cleared;
    clearing an exception that was raised when said debug event arose; and
    permitting said second process to resume execution of said debuggee program from a point where said program was executing when said debug event arose.

6. A system for facilitating debugging, the system comprising:
    one or more data remembrance devices;
    one or more processors;
    first software that is stored in at least one of said one or more data remembrance devices, that executes on said one or more processors, and that is loadable into a program, said program running in a first process in an environment, said program having a loop that reads input from a user and evaluates said input, said program instantiating a first instance of said loop, said first software exposing one or more debug commands that are enterable by said user into said loop, said one or more debug commands comprising a first command that requests to display information associated with a symbol defined in said program, at least one of said one or more debug commands invoking second software that runs in a second process in said environment; and
    said second software, which is stored in at least one of said one or more data remembrance devices and which executes on said one or more processors, said second software attaching to said first process as a debugger of said first process, said second software using a first method to invoke, in response to receipt of notification of an event arising in said first process, a second instance of said loop in said first process, said first method being provided by a debugging infrastructure of said environment, said first command being receivable from said user into said second instance of said loop, there being a function that executes under said program, a second of said one or more debug commands comprising a command to set a return value of said function to a value that is specified by said user, and said second software using a second method provided by said debugging infrastructure to place the value that is specified by said user in a memory location reserved for said function's return value.

7. The system of claim 6, wherein said first software determines, in response to said first command, whether said symbol is a global symbol defined in said program, and requests a resolution of said symbol from said second software in a case in which said symbol is not a global symbol, and wherein said second software resolves said symbol as a local symbol in a function that runs in said program.

8. The system of claim 7, wherein said first command is in a form of at least one of:
   a function call, where said function call invokes a method that obtains a value associated with said symbol; or
   said name of said symbol, wherein said loop provides programming that obtains and displays said value when said symbol is entered.

9. The system of claim 6, wherein said second software places local variables and their values into a scope associated with said second instance of said loop.

10. The system of claim 6, wherein said first software causes a local variable in said function to be reserved to hold a value to be returned by said function, and wherein said second software places the value that is specified by said user into said local variable.

11. The system of claim 6, wherein said event comprises suspension of a function that is executing under said program, wherein said second software receives notification that said second instance of said loop has terminated and instructs said first process to resume execution of said function from a point where said function was suspended.

12. The system of claim 6, wherein said event comprises suspension of a function that is executing under said program, said suspension being associated with raising of an exception, wherein said first software instructs said second software that outstanding exceptions are to be cleared, wherein said second software clears said exception and permits said first process to resume execution of said function from a point where said function was suspended.

13. One or more computer-readable storage media having executable instructions to perform a method comprising:
   receiving, through a first instance of a loop, a first instruction from a user to start a first program, said first instance running in a first process in an environment;
   receiving, in a second process in said environment, a first notification that an event has arisen in said first process, said second process executing a second program that attaches to said first process as a debugger of said first process;
   using a first method in said second process to invoke a second instance of said loop in said first process, said first method being provided by a debugging infrastructure of said environment;
   receiving, in said second instance of said loop, a second instruction from said user, said second instruction being a debug instruction, said debug instruction being to set a return value of a function in said first program to a value that is specified by said user;
   providing, to said second process, first information that is based on said second instruction; and
   in said second process, using a second method to instruct said first process to perform at least one debug action based on said first information, or to retrieve, from said first process, symbol information that is specified in said first information and that is to be displayed by said second instance of said loop, said second method being a debug primitive that is provided by said debugging infrastructure, said second method placing the value that is specified by said user in a memory location reserved for said function's return value.

14. The one or more computer-readable storage media of claim 13, wherein said second instruction indicates that a breakpoint is to be set in said first program, wherein said first information comprises an indication of a location in said first program of said breakpoint, and wherein the using of said second method comprises:
   using said second method to set said breakpoint at said location.

15. The one or more computer-readable storage media of claim 13, wherein said second instruction indicates a name of a symbol, and wherein the method further comprises:
   determining, by said second instance of said loop, that said name is not associated with a global symbol in said first process;
   in said first process, issuing a request to said first process to resolve said name; and
   using said second method to retrieve a value associated with said name.

16. The one or more computer-readable storage media of claim 13, wherein said second instruction indicates that execution of said first program is to be continued, and wherein the method further comprises:
   receiving, in said second process, a second notification that said second instance of said loop has terminated; and
   permitting said first process to resume execution from a point where said first program was executing when said event arose.

17. The one or more computer-readable storage media of claim 13, wherein said second instruction indicates that execution of said first program is to be continued, wherein said first information comprises an indication that outstanding exceptions are to be cleared, and wherein the method further comprises:
   said second process clearing an exception that was raised when said event arose; and
   permitting said first process to resume execution from a point where said first program was executing when said event arose.

18. The one or more computer-readable storage media of claim 13, wherein said loop is implemented by a software component that is part of a language interpreter, and wherein said loop reads input from said user, evaluates said input, and displays a result of evaluating said input, said first instruction being an instance of said input.

* * * * *